United States Patent Office 3,418,131
Patented Dec. 24, 1968

3,418,131
METHOD OF STABILIZING THE BACKGROUND IN LIGHT DEVELOPABLE SILVER HALIDE EMULSIONS USING THIAZOLE CONTAINING COMPOUNDS
John Howard Bigelow, Rochester, N.Y., assignor to E. I. du Pont de Nemours and Company, Wilmington, Del., a corporation of Delaware
No Drawing. Filed Feb. 1, 1966, Ser. No. 523,961
8 Claims. (Cl. 96—109)

This invention relates to light-developable, direct-writing, radiation-sensitive emulsions having improved sensitometric characteristics.

The process of making light-developable, direct-writing silver halide emulsions of this invention comprises (1) Admixing a water-soluble silver salt with an acidified aqueous solution of a water-soluble chloride containing a water-permeable organic colloid binding agent, (2) Adding thereto, an organic solvent solution containing from 0.001 to about 0.8 mole percent based on the silver of (a) A thiazole compound containing at least one of the nuclei:

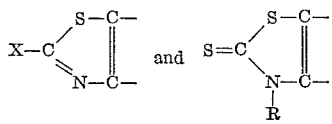

wherein X is Cl, SH, $NH_2$, $CH_3$, $C_2H_5$, phenyl or

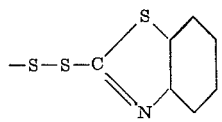

R is alkyl of 1–4 carbons, e.g., methyl, ethyl, isopropyl and n-butyl or substituted alkyl, e.g., 3(N-piperidinomethyl)- and 3-(beta-naphthyl-N-phenylaminomethyl)-, or (b) An organic amine salt of said thiazole compound;

(3) Ripening the precipitated silver chloride emulsion, e.g., at a temperature above 100° F., and adding thereto at ripening temperature from 50 to 200 mole percent based on the silver of a water-soluble bromide, (4) Digesting the resulting emulsion and prior to completion of the digestion or coating, incorporating with the emulsion based on the silver, (i) a water-soluble salt of copper or lead in an amount of about 0.1 to 25 mole percent, and (ii) a halogen acceptor.

An important point is that the thiazole be admixed either during or just after precipitation of silver chloride and either before or during the conversion of a substantial part of the silver chloride to silver bromide, preferably by means of an organic solvent solution of the thiazole compound. The process has the advantage that the resulting direct-writing, light-developable silver halide emulsions have low image fading and suppressed background density growth characteristics. Also, the exposed emulsion layer can be developed and fixed with conventional solutions.

The invention is quite specific to thiazole compounds as the following examples evidence that other azoles and mercapto-azoles do not exhibit an image stabilizing effect when added after the silver chloride precipitation step.

Suitable other water-soluble silver salts and water-soluble chlorides are listed in Maffet U.S. Patent 3,000,737, Sept. 19, 1961.

As solvents which may be used for adding the thiazole compound, there may be mentioned water-miscible solvents, e.g., methanol, ethanol and acetone or a water-immiscible solvent which is photographically innocuous, e.g., benzene, toluene, or xylene.

Suitable amine salts include the biguanide, phenyl biguanide and diphenyl biguanide salts.

The following compounds comprise those having a thiazole residue which have been found to be effective for use in the present invention.

phenyl biguanide mercaptobenzothiazole salt
2-mercapto benzothiazole
2-mercapto-4-phenyl-thiazole
2-benzothiazole disulfide
2-chlorobenzothiazole
2-methyl benzothiazole
2-phenyl benzothiazole
2,4-dimethyl thiazole
2-methyl-6-nitro benzothiazole
2-aminobenzothiazole
6-amino-2-mercapto benzothiazole
5-chloro-2-methyl benzothiazole
2-amino thiazole
benzothiazole
3(beta-naphthyl - N - phenylaminomethyl)benzothiazole-2-thione
3(N-piperidinomethyl)benzothiazole-2-thione The precipitation may be carried out using potassium chloride as the water-soluble chloride and is preferably done by slowly adding an aqueous solution of silver nitrate to an acidified solution of potassium chloride containing a water-permeable organic colloid, e.g. gelatin. After or during the precipitation of silver chloride there is added a methanol solution of the thiazole compound and the emulsion is then ripened at a temperature above 100° F. After ripening, the water soluble bromide, preferably potassium bromide, is added as an aqueous solution while the emulsion is held at ripening temperature. After the ripening step and addition of soluble bromide, the emulsion may or may not be, but preferably is washed in the manner described in Moede U.S. Patent 2,772,165. The emulsion is redispersed and digested in a conventional manner. At this point or prior to digestion, optical sensitizing dyes may be added optionally to increase the spectral response of the emulsion layer for use in instruments employing a variety of light sources. During this operation from 0.1 to 25 mole percent of a soluble plumbous or cupric salt and a halogen acceptor are added. The halogen acceptors which may be used comprise stannous chloride, salts providing iodide and thiocyanate ions, molecular iodine, alkali-metal nitrites, phenylenediamines, aminophenols, hydroquinones, amine and amine salts, compounds with an alkaline reaction, such as borax, the hydroxides of alkali metals, ammonium hydroxide, 3-pyrazolidones, and other known halogen acceptors. The preferred halogen acceptors for this invention are stannous chloride and the combination of iodide and thiocyanate ions. In general from 0.5 to 120 mole percent and preferably 5 to 40 mole percent of a stannous salt based on the silver may be used and 0.2 to 2.0 mole percent each of potassium iodide and potassium thiocyanate may also be used. After the digestion step, the usual coating adjuvants, e.g., hardeners, wetting agents, etc. are added and the viscosity is adjusted as desired by the addition of a further quantity of gelatin or other colloid. In general the ratio of gelatin to silver halide is 2:1, however, this is not at all critical. The prepared emulsion is then coated on a suitable support, e.g., paper and dried to give a dry coating weight equivalent to about 30 mg. $AgBr/dm.^2$ To determine the sensitometric characteristics of the material it may be exposed through a power of 2 step wedge in an electronic flash sensitometer similar to that described by Wyckoff and Edgerton, Journal of the Society of Motion Picture and Television Engineers, 66, 474 (1957). This instrument uses a xenon discharge tube as the source of radiation and has available two exposure times of 10 and 1000 microseconds. The exposed material may be light developed by irradiation under cool white fluorescent lighting at about 95 foot-candles intensity. To determine the densities of the image and background, a reflection densitometer may be used whose values correspond to visual density. To test the stability of the light developed image and the background, the exposed and light developed material was continuously exposed to the above fluorescent lighting for 3 days.

The following examples further illustrate but are not intended to limit the scope of the invention:

Example I

A gelatino-silver chlorobromide emulsion was made by slowly adding an aqueous solution containing 1 mole of silver nitrate and 0.033 mole of plumbous nitrate to a gelatin solution containing 1 mole of potassium chloride acidified with 0.05 mole of hydrochloric acid. The precipitation was carried out under a red safelight. The temperature at precipitation and for 40 minutes thereafter was held at 160° F. In order to demonstrate that thiazoles provide outstanding light developed image stability and that other heterocyclic azoles do not appear to function in this capacity the emulsion, after precipitation, was divided into five portions and organic heterocyclic azole compounds as indicated in the following table were added to each from a methanol solution. After the addition of the azole compounds there was added to each emulsion an amount of potassium bromide to provide 1.6 moles per mole of silver, the emulsion being held at 160° F. The resulting emulsions were coagulation washed in the manner similar to that described in assignee's Moede U.S. Patent 2,772,165. The emulsions were redispersed and gelatin necessary to provide about 9% concentration was added to each. There was added to each of the emulsions, 2 mole percent of plumbous nitrate, 60 mole percent of potassium bromide and 20 mole percent of stannous chloride based on silver bromide. The emulsions were digested for 20 minutes at 130° F. After digestion, the mixture was cooled to coating temperature, borax was added as a buffer, coating aids and chrome alum were added and after adjusting the pH to 4.0 and adjusting to suitable coating viscosity, the emulsions were coated on paper supports to give a dry coating weight equivalent to about 30 mg. of silver bromide per square decimeter. The coated emulsions were dried in a conventional manner. Samples of the coated materials were given an exposure of 1000 microseconds in the flash tube sensitometer described above using a power of 2 step wedge. The exposed elements were light-developed for 5 minutes by radiation from a fluorescent light at 95 foot-candles intensity and the image and background densities read. The samples were then continuously exposed to the same fluorescent light conditions for three days and the image densities and background densities again read in the above described reflection densitometer to give the following results:

| Special Compound Added at Conversion | Light-developed, 5 Minutes | | | Light-developed, 3 Days | | | 5 Minutes vs. 3 Days | | |
|---|---|---|---|---|---|---|---|---|---|
| | Background [1] | $D_{max}$.[2] | Total Dens.[3] | Background | $D_{max}$. | Total Dens. | Percent Total Dens.[4] | Percent $D_{max}$.[5] | Stability |
| 2 mol percent phenyl biguanide 2-mercapto benzothiazole salt | .28 | .19 | .47 | .26 | .27 | .53 | 113 | 142 | Good. |
| 2 mol percent phenyl biguanide | .27 | .32 | .59 | .21 | .14 | .35 | 59 | 44 | Poor. |
| 2 mol percent 2-mercapto benzothiazole | .23 | .13 | .36 | .20 | .20 | .49 | 136 | 154 | Good. |
| 2 mol percent 2-mercapto benzoxalole | .21 | .24 | .45 | .18 | .12 | .30 | 67 | 54 | Poor. |
| None | .24 | .32 | .56 | .22 | .13 | .35 | 62 | 41 | Do. |

[1] Base set on white paper, read photolyzed density on Densichron densitometer, Model 1 with reflection probe 3832A, Wratten 106 plus 38A filters, and with lamp operated at 4.25 volts.
[2] Base set on background (1 above) and read density.
[3] Background plus $D_{max}$.
[4] Percent Dens.=Dens. after 3 days photolysis×100/Dens. after 5 min. photolysis.
[5] Percent $D_{max}$.=$D_{max}$. after 3 days photolysis×100/$D_{max}$. after 5 min. photolysis.

Example II

Example I was repeated up through the coagulation washing and redispersion step. There was added to each of the redispersed emulsions an optical sensitizing dye and then the emulsions were digested for 20 minutes at 130° F. After digestion 1 mole percent of potassium iodide, 20 mole percent of potassium thiocyanate, 60 mole percent of potassium bromide and 2 mole percent of plumbous nitrate based on the silver halide were added to each emulsion and then they were cooled to coating temperature. Coating aids and chrome alum were added and after adjusting the pH to 3.5 and adjusting the emulsions to suitable viscosities, they were coated on a paper suport to give a dry coating weight equivalent to about 30 mg. of silver bromide per square decimeter. The coated emulsions were dried in a conventional manner. Examples were tested as described in Example I and gave the following sensitometic data:

| Special Compound Added at Conversion | Light-developed, 5 Minutes | | | Light-developed, 3 Days | | | 5 Minutes vs. 3 Days | | |
|---|---|---|---|---|---|---|---|---|---|
| | Background [1] | $D_{max}$.[2] | Total Dens.[3] | Background | $D_{max}$. | Total Dens. | Percent Total Dens.[4] | Percent $D_{max}$.[5] | Stability |
| 2 mol percent phenyl biguanide 2-mercapto benzothiazole salt | .46 | .20 | .66 | .47 | .33 | .80 | 121 | 165 | Good. |
| 2 mol percent phenyl biguanide | .42 | .27 | .69 | .33 | .13 | .46 | 67 | 48 | Poor. |
| 2 mol percent 2-mercapto benzothiazole | .46 | .16 | .62 | .59 | .25 | .84 | 135 | 156 | Good. |
| 2 mol percent 2-mercaptobenzoxazole | .39 | .20 | .59 | .28 | .14 | .42 | 70 | 71 | Poor. |
| None | .42 | .26 | .68 | .37 | .06 | .43 | 63 | 23 | Do. |

[1] Base set on white paper, read photolyzed density on Densichron densitometer, Model 1 with reflection probe 3832A, Wratten 106 plus 38A filters, and with lamp operated at 4.25 volts.
[2] Base set on background (1 above) and read density.
[3] Background plus $D_{max}$.
[4] Percent Total Dens.= Dens. after 3 days photolysis X100/Dens. after 5 minutes photolysis.
[5] Percent $D_{max}$.=$D_{max}$. after 3 days photolysis X100/$D_{max}$. after 5 minutes photolysis.

Example III

In order to show that it is important that the thiazole compound be incorporated in the system before the addition of potassium bromide to convert the emulsion from a pure silver chloride emulsion to a silver chlorobromide emulsion the procedure of Example I was repeated using a single emulsion. Just the phenyl biguanide-2-mercaptobenzothiazole salt was added at different stages of the preparation in an amount of 0.5 mole percent. All the other additions were the same as the control emulsion. Sensitometric testing as described in Example I gave the following data:

| 0.5 mol percent Thiazole Added | Light-developed, 5 Minutes | | | Light-developed, 3 Days | | | 5 Minutes vs. 3 Days | | |
|---|---|---|---|---|---|---|---|---|---|
| | Background | $D_{max}$ | Total Dens. | Background | $D_{max}$ | Total Dens. | Percent Total Dens. | Percent $D_{max}$ | Stability |
| In gelatin potassium chloride solution | .18 | .13 | .31 | .26 | .15 | .41 | 132 | 115 | Good. |
| At conversion | .19 | .17 | .36 | .21 | .17 | .38 | 105 | 100 | Do. |
| After conversion | .17 | .23 | .40 | .16 | .12 | .28 | 70 | 52 | Poor. |

Example IV

An emulsion was made following the general procedure of Example I but using varying quantities of two thiazole compounds and showing that while the presence of a plumbous salt at precipitation is beneficial it is not necessary. The presence or absence of lead and varying quantities of thiazoles are indicated in the following table together with the sensitometric results:

Example VI

Example II which uses the iodide-thiocyanate halogen acceptor system was repeated except that only a single emulsion was made using varying quantities of 2-mercapto benzothiazole as indicated in the table below. All other conditions and additions were the same as Example II. The following sensitometric data were obtained:

| Mol percent conc. of 2-mercapto benzothiazole at Br- conversion during make | Light-developed, 5 Minutes | | | Light-developed, 3 Days | | | 5 Minutes vs. 3 Days | | |
|---|---|---|---|---|---|---|---|---|---|
| | Background | $D_{max}$ | Total Dens. | Background | $D_{max}$ | Total Dens. | Percent Total Dens. | Percent $D_{max}$ | Stability |
| .01 | .31 | .21 | .52 | .28 | .06 | .34 | 65 | 29 | Poor. |
| .05 | .32 | .20 | .52 | .25 | .12 | .37 | 71 | 60 | Fair. |
| .5 | .34 | .19 | .53 | .32 | .27 | .59 | 111 | 142 | Good. |
| 2.0 | .34 | .19 | .43 | .41 | .26 | .67 | 126 | 137 | Do. |
| 8.0 | .30 | .12 | .42 | .45 | .13 | .58 | 138 | 108 | Do. |

Example VII

This example shows a comparison of mercaptan versus thiazole compounds and the various places of addition which clearly shows the selective function of the compounds useful in the invention. Emulsions were made according to the procedures of Examples I and II and the

| Thiazole added at conversion | Light-developed, 5 Minutes | | | Light-developed, 3 Days | | | 5 minutes vs. 3 days | | | |
|---|---|---|---|---|---|---|---|---|---|---|
| | Background | $D_{max}$ | Total Dens. | Background | $D_{max}$ | Total Dens. | Percent Total Dens. | Percent $D_{max}$ | $Pb^{+2}$ at Make | Stability |
| No | .17 | 1.5 | .32 | .11 | .07 | .18 | 56 | 47 | No | Poor. |
| No | .20 | .19 | .39 | .18 | .16 | .34 | 87 | 84 | Yes | Fair. |
| 0.5 mol percent phenyl biquanide salt of 2-mercapto benzothiazole | .24 | .18 | .42 | .24 | .18 | .42 | 100 | 100 | No | Good. |
| 0.5 mol percent phenyl biquanide salt of 2-mercapto benzothiazole | .18 | .14 | .32 | .25 | .21 | .46 | 144 | 150 | Yes | Do. |
| 0.5 mol percent 2-mercapto benzothiazole | .21 | .12 | .33 | .25 | .15 | .40 | 121 | 125 | No | Do. |
| 0.5 mol percent 2-mercapto benzothiazole | .21 | .15 | .36 | .44 | .12 | .56 | 155 | 180 | Yes | Do. |

Example V

A single emulsion was made using the procedure of Example I using varying quantities of 2-mercapto benzothiazole. All other additions of plumbous and stannous salts are as described in that example. Sensitometry of the test samples gave the following data:

various additions, places of addition and types of halogen acceptor system used with the sensitometric data are shown in the following table. Where it is indicated that a compound is added at remelt this means that it is added after the bromide conversion and the washing step and during or prior to the digestion step.

| Mol percent conc. of 2-mercapto benzothiazole at Br- conversion during make | Light-developed, 5 Minutes | | | Light-developed, 3 Days | | | 5 Minutes vs. 3 Days | | |
|---|---|---|---|---|---|---|---|---|---|
| | Background | $D_{max}$ | Total Dens. | Background | $D_{max}$ | Total Dens. | Percent Total Dens. | Percent $D_{max}$ | Stability |
| 0.001 | .35 | .15 | .50 | .24 | .16 | .40 | 80 | 107 | Good. |
| .01 | .33 | .21 | .54 | .26 | .23 | .49 | 91 | 109 | Do. |
| .1 | .20 | .18 | .38 | .23 | .15 | .38 | 100 | 83 | Do. |
| 2.0 | .15 | .07 | .22 | .21 | .24 | .45 | 205 | 342 | Do. |
| 8.0 | .13 | .04 | .17 | .18 | .10 | .28 | 165 | 250 | Do. |

| Material and where added in process | Light-developed, 5 Minutes [4] | | | Light-developed, 3 Days | | | 5 Minutes vs. 3 Days | | |
|---|---|---|---|---|---|---|---|---|---|
| | Back-ground[1] | $D_{max}$[2] | Total Dens.[3] | Back-ground | $D_{max}$ | Total Dens. | Percent Total Dens. | Percent $D_{max}$ | Stability |
| 0.11 mol percent [5] 1-dodecane thiol added at start of remelt. | .18 | .24 | .42 | .16 | .07 | .23 | 55 | 29 | Poor. |
| 0.05 mol percent [6] 1-dodecane thiol at conversion | .22 | .24 | .46 | .21 | .17 | .38 | 61 | 71 | Do. |
| 0.05 mol percent [5] 1-dodecane thiol at conversion | .36 | .22 | .58 | .29 | .11 | .40 | 69 | 50 | Do. |
| 0.05 mol percent [5] 2-mercaptoimidazoline at conversion. | .24 | .21 | .45 | .24 | .16 | .40 | 89 | 76 | Do. |
| 0.05 mol percent [6] 2-mercaptoimidazoline at conversion. | .36 | .20 | .56 | .29 | .09 | .38 | 68 | 45 | Do. |
| 2 mol percent [5] 2-methyl benzothiazole at conversion. | .31 | .13 | .44 | .21 | .15 | .36 | 82 | 115 | Good. |
| 0.1 mol percent [5] 2,4-dimethyl thiazole at conversion. | .29 | .14 | .43 | .21 | .12 | .34 | 79 | 93 | Do. |
| 2 mol percent [5] benzothiazole at conversion | .35 | .14 | .49 | .25 | .23 | .48 | 98 | 164 | Do. |
| 2 mol percent [5] 2-amino thiazole at conversion | .35 | .14 | .49 | .27 | .18 | .45 | 92 | 128 | Do. |

[1] Base set on white paper and where not exposed on sensitometer read photolyzed density on Densichron densitometer, Model I with reflection probe 3832A, Wratten 106 plus 38A filters, and with lamp operated at 4.25 volts.
[2] Base set on background (1 above) and read density.
[3] Background plus $D_{max}$.
[4] Expose to $D_{max}$ on Edgerton, Germeshausen and Grier Mark VI Sensitometer at 0.001 sec. and photolyze under daylight fluorescent light at 95 ft. candles.
[5] Remelted in $Sn^{+2}$ halogen acceptor of Example I.
[6] Remelted in $I^-$ plus $CNS^-$ halogen acceptor system of Example II.

Example VIII

An emulsion was made according to the procedure of Example I using the stannous ion halogen acceptor system and the compound, 2-mercapto-4-phenyl thiazole was added as indicated in the following table with the sensitometric data obtained:

Example X

Emulsions are made after the manner described in Example II except that there is added an amount as indicated in the following table of a methanol solution of 2-mercapto-benzothiazole and the admixture is held for 5 minutes before adding the bromide.

| Material and Where Added in Process | Light-developed, 5 Minutes [4] | | | Light-developed, 3 Days | | | 5 Minutes vs. 3 Days | | |
|---|---|---|---|---|---|---|---|---|---|
| | Back-ground[1] | $D_{max}$[2] | Total Dens.[3] | Back-ground | $D_{max}$ | Total Dens. | Percent Total Dens. | Percent $D_{max}$. | Stability |
| 0.02 mol percent 2-mercapto-4-phenyl thiazole at start of remelt. | .19 | .22 | .41 | .17 | .04 | .21 | 51 | 18 | Poor. |
| 0.11 mol percent 2-mercapto-4-phenyl thiazole at start of remelt. | .18 | .16 | .34 | .16 | .08 | .24 | 71 | 50 | Do. |
| 0.06 mol percent 2-mercapto-4-phenyl thiazole at $Br^-$ conversion. | .19 | .18 | .37 | .23 | .23 | .46 | 124 | 128 | Good. |
| Control: No special additive | .20 | .23 | .43 | .17 | .15 | .32 | 74 | 65 | Poor. |

[1] Base set on white paper and where not exposed on sensitometer read photolyzed density on Densichron densitometer, Model I with reflection probe 3832A, Wratten 106 plus 38A filters, and with lamp operated at 4.25 volts.
[2] Base set on background (1 above) and read density.
[3] Background plus $D_{max}$.
[4] Expose to $D_{max}$ on Edgerton, Germeshausen and Grier Mark VI Sensitometer at 0.001 sec. and photolyze under daylight fluorescent light at 95 ft. candles.

Example IX

Emulsions were made according to the general procedure of Examples I and II and benzothiazole in the mole percents based on the silver halide were added as indicated in the table below which designates the halogen acceptor system and sets forth the comparison sensitometry for image stability.

| Mol percent benzothiazole at $Br^-$ conversion | 5 Minutes vs. 3 Days | | |
|---|---|---|---|
| | Percent Total Dens. | Percent $D_{max}$ | Rating |
| 0.1 [1] | 83 | 69 | Fair. |
| 0.5 [1] | 143 | 181 | Good. |
| 1.0 [1] | 141 | 186 | Do. |
| 2.0 [1] | 151 | 208 | Do. |
| 4.0 [1] | 137 | 175 | Do. |
| 0.0 [1] | 68 | 50 | Poor. |
| 0.5 [2] | 144 | 223 | Good. |
| 1.0 [2] | 113 | 93 | Do. |
| 2.0 [2] | 125 | 100 | Do. |
| 4.0 [2] | 145 | 150 | Do. |
| 0.0 (Control)[2] | 67 | 32 | Poor. |

[1] Remelted in $Sn^{-2}$ halogen acceptor system.
[2] Remelted in $I^-$ plus $CSN^-$ halogen acceptor system.

During the remelting step as described in Example VII a mixture of the redispersed emulsion, gelatin necessary to provide about 9 percent concentration for coating and a sensitizing dye is digested at 130° F. for 20 minutes. The mixture is cooled to coating temperature and 0.01 mole KI, 0.05 mole KCNS, 1.2 mole KBr, 0.04 mole $Pb(NO_3)_2$ per mole of AgBr, chrome alum, coating aid, and water are added.

The emulsion is coated on a paper support to give a coating weight equivalent to 30 mg. $AgBr/dm.^2$, and dried.

Sensitometry data are given in the following table:

| Amount 2-mercapto benzothiazole at conversion, mol percent | Method No. 1 | | | Method No. 2 | | | Photolyzed Image* Stability | | |
|---|---|---|---|---|---|---|---|---|---|
| | Background | $D_{max}$ | Total Dens. | Background | $D_{max}$ | Total Dens. | Percent Total Dens. | Percent $D_{max}$ | Stability |
| 0.01 | .30 | .28 | .58 | .09 | 1.15 | 1.24 | 65 | 29 | Poor. |
| 0.05 | .34 | .24 | .58 | .11 | 1.12 | 1.23 | 71 | 60 | Fair. |
| 0.1 | .31 | .23 | .54 | .11 | 1.13 | 1.24 | 108 | 117 | Good. |
| 0.5 | .36 | .22 | .58 | .08 | 1.11 | 1.19 | 111 | 142 | Do. |
| 2.0 | .39 | .17 | .56 | .09 | 1.12 | 1.21 | 126 | 137 | Do. |
| 4.0 | .37 | .12 | .49 | .07 | 1.03 | 1.10 | 132 | 119 | Do. |
| 8.0 | .32 | .09 | .41 | .09 | .95 | 1.04 | 138 | 108 | Do. |
| Control | .25 | .23 | .48 | .03 | 1.08 | 1.11 | 62 | 12 | Poor. |

*Expose on Edgerton, Germeshausen and Grier Mark VI Sensitometer at 0.001 sec. and light developed under daylight fluorescent light at 95 ft. candles. Compare $D_{max}$ and total dens. ($D_{max}$ plus background dens.) of samples light developed 3 days vs. 5 minutes.

Method 1—Expose on Edgerton, Germeshausen and Grier Mark VI Sensitometer at 0.001 sec. through a power of 2 step wedge. Light develop by irradiation from daylight fluorescent tubes at an intensity level of 50 ft. candles for 4 min. Read densities on reflection densitometer. Dye dens.=dens. difference between white paper and nonlight-developed sample. Background=dens. difference between white paper and light-developed sample. $D_{max}$=dens. difference between background and maximum density.

Method 2—Expose as in (1) but do not light develop. Develop 1 min. at 68° F. in a conventional paper developer. Fix 2 to 5 min. in a conventional fixer. Wash and dry. Read densities on densitometer. Background=dens. difference between white paper and unexposed, wet processed sample. $D_{max}$=dens. difference between background and maximum density. Total dens.=$D_{max}$ plus background densities.

Example XI

To demonstrate that image stability is retained even at low coating weights, an emulsion was made in the manner described in Example I and only the phenyl biguanide salt of 2-mercaptobenzothiazole was incorporated in one portion of the emulsion in an amount of 2 mole percent. A control emulsion was made and the emulsions coated to give the coating weight equivalents shown in the following table. The sensitometric data was obtained according to the photolysis methods described in Example I.

| Coating Wt. Equivalent to mg. AgBr/dm.² | Light-developed, 5 minutes | | | Light-developed, 3 days | | | 5 min. vs. 3 days | | |
|---|---|---|---|---|---|---|---|---|---|
| | Background | $D_{max}$ | Total Dens. | Background | $D_{max}$ | Total Dens. | Percent Total Dens. | Percent $D_{max}$ | Stability |
| No Thiazole: | | | | | | | | | |
| 42 | .24 | .30 | .54 | .22 | .17 | .39 | 72 | 57 | Poor. |
| 22 | .16 | .26 | .42 | .15 | .12 | .27 | 64 | 46 | Do. |
| 6.5 | .09 | .10 | .19 | .07 | .04 | .11 | 58 | 40 | Do. |
| Thiazole added: | | | | | | | | | |
| 24 | .35 | .19 | .54 | .31 | .29 | .60 | 111 | 153 | Good. |
| 5.8 | .14 | .07 | .21 | .14 | .11 | .25 | 119 | 157 | Do. |

Stannous chloride may be added from aqueous solutions, particularly when such solutions are made using the anhydrous stannous compound.

Where it is desired, other halides or combination of halides may be used to form the silver halide grains. For example, pure silver chloride or pure silver chlorobromide may be used. Where soluble chloride salts are used it is desirable, because of solubility differences, to form the silver halide grains of desired composition and size and then add sufficient soluble bromide salts to provide the desired concentration of bromide ions.

Although the role of the thiazole compounds when added before or during bromide conversion and before crystal formation is complete is not fully understood, it is believed that the presence of the thiazole compound controls crystal formation in such a manner that a notable improvement is realized in image stability. As indicated above, the thiazole compounds exhibit this beneficial effect either in emulsions which do not have a plumbous salt present at precipitation of the silver chloride or in emulsions which do have a plumbous salt incorporated in the system at precipitation of the silver chloride as taught by the above Bigelow patent.

In place of the gelatin binding agent used in the foregoing examples there can be substituted other material or synthetic water-permeable organic colloid binding agents, including the binding agents listed in Hunt 3,033,682.

Suitable supports for the novel photographic emulsions of this invention include those used in the prior oscillographic recording elements. The preferred support is photographic grade paper but may be a hydrophobic film composed of a cellulose ester, e.g., cellulose acetate or a polymer, e.g., the polyester films disclosed in Alles et al. 2,627,088 and 2,779,684.

The novel process of this invention produces light-developable, direct-writing, photosensitive emulsion layers and elements having several advantages over the prior art products. The emulsion layers and elements upon exposure to high-intensity radiation and subsequent light-development, yield images of high maximum density and greater stability against image fading than are obtainable with direct writing elements known heretofore. In addition to being extremely convenient to use because wet processing can be eliminated, the elements are adaptable to conventional chemical development. The elements may be subjected to relatively high intensity illumination for long time periods. The elements can be used to reproduce photographically the image record by high intensity exposing radiation and without serious image deterioration. The elements have high photographic speed and also may be processed in the manner disclosed in Assignee's Hunt and Bigelow patents referred to above, in Hunt U.S.P. 3,183,088 and Hunt U.S. Ser. No. 152,914, filed Nov. 16, 1961, now patent No. 3,241,961.

The embodiments of the invention in which an exclusive property or privilege is claimed are defined as follows:

1. A process for making a light-developable, direct-writing silver halide emulsion which comprises
   (1) admixing a water-soluble silver salt with an acidified aqueous solution of a water-soluble chloride containing a water-permeable organic colloid binding agent,
   (2) adding thereto, an organic sovent solution containing from 0.001 to about 0.8 mole percent based on the silver of (a) a thiazole compound containing at least one of the nuclei:

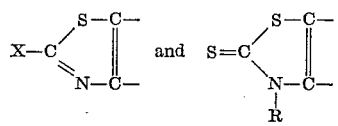

wherein X is Cl, SH, NH$_2$, CH$_3$, C$_2$H$_5$, phenyl or

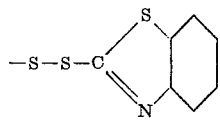

R is alkyl of 1-4 carbons, e.g., methyl, ethyl, isopropyl and n-butyl or substituted alkyl, e.g., 3(N-piperidinomethyl)- and 3-(beta-naphthyl-N-phenylaminomethyl)-, or (b) an organic amine salt of said thiazole compound;

(3) ripening the precipitated silver chloride emulsion and adding thereto at ripening temperature from 50 to 200 mole percent based on the silver of a water-soluble bromide, and (4) digesting the resulting emulsion and prior to completion of the digestion or coating, incorporating with the emulsion based on the silver, (i) a water-soluble salt of copper or lead in an amount of about 0.1 to 25 mole percent, and (ii) a halogen acceptor.

2. A process according to claim 1 wherein said colloid binding agent is gelatin.

3. A process according to claim 1 wherein said halogen acceptor is stannous chloride.

4. A process according to claim 1 wherein the halogen acceptor is potassium thiocyanate.

5. A process according to claim 1 wherein the halogen acceptor is potassium iodide.

6. A process according to claim 1 wherein the halogen acceptor is a mixture of potassium thiocyanate and potassium iodide.

7. A process according to claim 1 wherein the silver salt is admixed from aqueous silver nitrate.

8. A process according to claim 1 wherein the water-soluble salt of lead is admixed during step (1).

No references cited.

NORMAN G. TORCHIN, *Primary Examiner.*

J. R. EVERETT, *Assistant Examiner.*

U.S. Cl. X.R.

96—107, 108, 119